United States Patent
Timberlake et al.

(10) Patent No.: US 9,145,488 B2
(45) Date of Patent: Sep. 29, 2015

(54) ALUMINUM PHOSPHORUS ACID SALTS AS EPOXY RESIN CURE INHIBITORS

(75) Inventors: Larry D. Timberlake, West Lafayette, IN (US); Mark V. Hanson, West Lafayette, IN (US); Kenneth Bol, West Lafayette, IN (US)

(73) Assignee: Chemtura Corporation, Middlebury, CT (US)

( * ) Notice: Subject to any disclaimer, the term of this patent is extended or adjusted under 35 U.S.C. 154(b) by 628 days.

(21) Appl. No.: 13/455,414

(22) Filed: Apr. 25, 2012

(65) Prior Publication Data

US 2012/0296013 A1  Nov. 22, 2012

Related U.S. Application Data

(60) Provisional application No. 61/487,851, filed on May 19, 2011.

(51) Int. Cl.

| | | |
|---|---|---|
| *C08L 63/04* | (2006.01) | |
| *C08G 59/62* | (2006.01) | |
| *C08G 59/50* | (2006.01) | |
| *C08K 5/13* | (2006.01) | |
| *C08K 5/53* | (2006.01) | |
| *C08K 5/5313* | (2006.01) | |
| *C08K 5/5317* | (2006.01) | |
| *B32B 5/26* | (2006.01) | |
| *B32B 5/28* | (2006.01) | |
| *B32B 15/092* | (2006.01) | |
| *B32B 15/14* | (2006.01) | |
| *B32B 27/28* | (2006.01) | |
| *C08G 59/68* | (2006.01) | |
| *B32B 38/00* | (2006.01) | |
| *B32B 38/16* | (2006.01) | |

(52) U.S. Cl.
CPC ... *C08K 5/53* (2013.01); *B32B 5/26* (2013.01); *B32B 5/28* (2013.01); *B32B 15/092* (2013.01); *B32B 15/14* (2013.01); *B32B 38/164* (2013.01); *C08K 5/5313* (2013.01); *C08K 5/5317* (2013.01); *B32B 2038/0076* (2013.01); *B32B 2038/168* (2013.01); *B32B 2250/40* (2013.01); *B32B 2260/023* (2013.01); *B32B 2260/046* (2013.01); *B32B 2262/101* (2013.01); *B32B 2305/076* (2013.01); *B32B 2307/202* (2013.01); *B32B 2307/3065* (2013.01); *B32B 2311/00* (2013.01); *B32B 2363/00* (2013.01); *B32B 2457/08* (2013.01); *C08G 59/621* (2013.01); *C08G 59/686* (2013.01)

(58) Field of Classification Search
CPC ...... C08K 5/53; C08K 5/5317; C08K 5/5313; B32B 38/164; B32B 15/092; B32B 5/28; B32B 15/14; B32B 5/26; B32B 2311/00; B32B 2363/00; B32B 2038/0076; B32B 2038/168; B32B 2262/101; B32B 2457/08; B32B 2260/023; B32B 2307/202; B32B 2260/046; B32B 2307/3065; B32B 2305/076; B32B 2250/40
USPC ......... 525/503; 523/451; 156/330; 427/207.1
See application file for complete search history.

(56) References Cited

U.S. PATENT DOCUMENTS

| | | | |
|---|---|---|---|
| 4,973,631 | A | 11/1990 | McGrath et al. |
| 6,207,736 | B1 | 3/2001 | Nass et al. |
| 6,403,220 | B1 | 6/2002 | Brennan et al. |
| 6,420,459 | B1 | 7/2002 | Hörold |
| 2002/0119317 | A1 | 8/2002 | Gan et al. |
| 2002/0155298 | A1 | 10/2002 | Hirai et al. |
| 2002/0168527 | A1 | 11/2002 | Hanson et al. |
| 2003/0148109 | A1* | 8/2003 | Timberlake et al. ......... 428/417 |
| 2007/0082986 | A1* | 4/2007 | Peters et al. ................. 524/126 |
| 2008/0171800 | A1 | 7/2008 | Dietz et al. |

FOREIGN PATENT DOCUMENTS

| | | |
|---|---|---|
| EP | 0 754 728 A1 | 1/1997 |
| EP | 1 116774 A2 | 7/2001 |
| JP | 2000-186186 | 7/2000 |

* cited by examiner

*Primary Examiner* — Randy Gulakowski
*Assistant Examiner* — Ha Nguyen
(74) *Attorney, Agent, or Firm* — Dilworth IP LLC

(57) ABSTRACT

Certain aluminum salts of organic phosphorus acids are found to have a strong effect on inhibiting the epoxy cure rate in epoxy formulations. The substances act catalytically and can be used at a low level in an epoxy formulation to adjust the reactivity of a resin formulation to give longer gel times. Compositions and methods of preparing and using the compositions are disclosed.

12 Claims, No Drawings

ALUMINUM PHOSPHORUS ACID SALTS AS EPOXY RESIN CURE INHIBITORS

This application claims benefit under 35 USC 119(e) of U.S. provisional application No. 61/487,851, filed May 19, 2011, the disclosure of which is incorporated herein by reference.

This invention relates to a method for inhibiting the cure of epoxy compositions by adding to curable epoxy compositions a small amount of an aluminum phosphonate, phosphinate or phosphate salt cure inhibitor, and to epoxy compositions having a controlled cure rate containing said aluminum salts, for example, flame retardant, halogen free epoxy compositions, such as those useful in the production of electrical laminates.

BACKGROUND

Composite materials based on epoxy resins are used in a variety of applications and continue to have considerable importance because of their versatility. A specific example of such an application is in the production of electrical laminates used in printed circuit boards (printed wiring boards, PWB). These electrical laminates are typically prepared, for example, from a fibrous reinforcement and an epoxy-containing matrix resin in a multi-step process.

For example, U.S. Pat. No. 6,403,220 and U.S. Pat. No. 6,645,631 describe a general process suitable for the preparation of electrical laminates in which (1) an epoxy-containing formulation is applied to or impregnated into a substrate, e.g., a woven or nonwoven fiber mat containing, for instance, glass fibers or paper, which substrate is then (2) heated at a temperature sufficient to draw off solvent in the epoxy formulation and optionally to partially cure the epoxy formulation. This heating step is known as "B-staging" and the product is known as a "prepreg", which is, as a result of "B-staging", more easily handled in subsequent manufacturing steps wherein (3) one or more sheets of prepreg are stacked or laid up in alternating layers with one or more sheets of a conductive material, such as copper foil, if an electrical laminate is desired, and pressed at elevated temperature and pressure for a time sufficient to cure the resin and form a laminate.

Common temperatures for the "B-staging" step are from about 90° C. to about 210° C. for a time ranging from about 1 minute to about 15 minutes, but other temperatures and times can be used.

A typical requirement for these laminates, as for many other applications, is flame resistance, and a fire retardancy level of V-0 in the standard "Underwriters Laboratory" test method UL 94 is typically desired. To achieve this level it is typically necessary to incorporate flame retardant compounds into the epoxy resin, which can conveniently occur when preparing the epoxy formulation applied or impregnated in step (1) above. Halogen containing compounds, such as tetrabromobisphenol A, are widely used. The laminates obtained using this material deliver properties and performance characteristics that are well-understood.

There is an increasing interest in non-halogen containing flame-retardants. However, these replacement materials must still be able to meet not only flame retardancy requirements, but also the physical requirements needed for individual applications, such as the mechanical properties, toughness, and solvent and moisture resistance desired in epoxy compositions that can be obtained using halogenated materials.

Phosphorus based flame retardants have been used as alternatives to halogenated flame retardants. Many such compounds are known, a number of which are commercially available. In order to avoid problems associated with loss of flame retardant, e.g., through exudation etc, reactive derivatives of phosphorus flame retardants which can react into the polymer resin are known and used in epoxy formulations. For example, phosphorus based flame retardants bearing groups such as hydroxy, amino, epoxy, vinyl, carboxylate etc., have been used in the preparation of flame resistant epoxy resins.

Reactive phosphorus containing flame retardants have been incorporated into epoxy resins by straightforward reactions to produce a phosphorus containing epoxy resin which are then cured using cross linking agents and standard methods. Alternatively, the phosphorus based flame retardant can be blended into a curable epoxy formulation as a reactive component, such as a crosslinker, and incorporated into the resin during cure.

Alkyl and aryl substituted phosphonic acid esters are compatible with epoxy resins but are also known plasticizers. Laminates formed therefrom tend to exhibit low glass transition temperatures, which are often unsatisfactory for use in electrical laminates. Further, the use of phosphonic acid esters in amounts sufficient to provide the necessary flame retardancy increases the tendency of the resulting cured epoxy resin to absorb moisture. The moisture absorbency of cured laminate board is significant because laminates containing high levels of moisture tend to blister and fail when subjected to the soldering operations typically employed in the manufacture of printed wiring boards.

Various other phosphorus based flame retardant materials are described in the literature, for example, EP 0 754 728 discloses a cyclic phosphonate, EP 1 116 774 uses a hydrogen phosphinate, 9,10-dihydro-9-oxa-10-phosphaphenanthrene-10-oxide, in conjunction with triphenylphosphine oxide, but their use in the manufacture of printed wiring boards tends create the difficulties above or have specific requirements that greatly add to the expense of manufacture.

Phosphine oxides have also been used as flame retardants in resins such as epoxy resins. Phosphine oxides containing groups capable of reacting into polymer resins such as epoxide, polyester, polyamide, polycarbonate etc, are also known, as is their use as flame retardants and cross linkers.

U.S. Pat. No. 4,973,631 discloses a triphenyl phosphine oxide curing agent of the formula

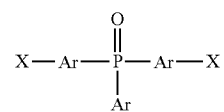

where each Ar is a substituted or unsubstituted phenyl ring and X is an epoxy-reactive substituent having active hydrogen, for example, amine, hydroxy, carboxy, anhydride, and thiol moieties.

JP 2000186186 A discloses compositions comprising epoxy resins, cross linking agents and organophosphorus compounds having one or more P—C covalent bonds and 2 or more hydroxy groups, for example, bis(p-hydroxyphenyl)phenylphosphine oxide and tris-(p-hydroxyphenyl)phosphine oxide.

U.S. Pat. No. 6,403,220 discloses mixtures comprising isomeric mixtures of unsubsituted and alkyl substituted tris-(ortho-hydroxyphenyl)phosphine oxides and their use as cross linkers in epoxy resin compositions. JP 05057991 discloses compositions comprising epoxy resins and meta-hydroxyphenyl phosphine oxides.

U.S. Pat. No. 6,733,698 discloses a mixture of hydroxyarylphosphine oxides comprising (a) a mono(hydroxyaryl)phosphine oxide, (b) a bis(hydroxyaryl)phosphine oxide, (c) a tris(hydroxyaryl)phosphine oxide, and, optionally (d) a tri-aryl, alkyl or aralkyl-substituted phosphine oxide useful as a crosslinker/flame retardant in, e.g., epoxy resins.

The above compounds can also be derivatized prior to incorporation into epoxy resins. For example, reaction between the phenoxy group and epichlorohydrin provides a useful epoxy functionalized material.

Mixtures of hydroxyarylphosphine oxides, such as those found in U.S. Pat. No. 6,733,698 and co-pending U.S. Pat Appl No. 12/807,642 and Ser. No. 12/857,994, are effective as both flame retardants and cross linkers in epoxy resins such as those used in electrical laminates. For example, they are readily formulated into curable epoxy compositions used in the formation of laminate prepregs, typically with phenolic-containing hardeners and amine catalysts. The cure rate of these formulations can be extremely fast and in some instances is too fast to allow for robust processing conditions. Greater control over the cure time would allow one to slow the rate of curing providing greater production flexibility and allow for a more fully optimized manufacturing process. For example, increasing the time during which a prepreg remains partially cured and easily handled, i.e., the 'gel time', would greatly improve process control over laminate production.

Combinations of amines with Lewis acids, especially boron compounds such as $BF_3$, boric acid and derivatives thereof, have long been used in the curing of epoxy resins. U.S. Pat. No. 6,645,631 describes Lewis acids, preferably boron Lewis acids, as inhibitors when used with amine catalysts, possibly suggesting that the role of the Lewis acid is to slow the cure rate by inhibiting the activity of the catalyst.

It is found that aluminum salts of certain organo-phosphorus acids, not previously disclosed as cure inhibitors, are very effective cure inhibitors for epoxy formulations.

SUMMARY

The cure time of epoxy formulations comprising a cross linker or hardener is increased by the addition of small amounts of aluminum salts of phosphorus acids. Curable epoxy compositions containing the salts, methods for preparing the compositions and processes for preparing articles comprising the cured epoxy composition are provided.

The present compositions comprise
a) an epoxy resin,
b) a cross linker, for example a phenolic cross linker, and
c) an aluminum phosphonate, phosphinate or phosphate salt cure inhibitor, typically present in an amount of less than 5 phr, i.e., parts per hundred parts epoxy resin, and often, good results are obtained using 4 phr or less of the cure inhibitor, for example, from about 0.01 to about 3 phr.

The invention also relates to curable epoxy reins compositions which further comprise
d) a phosphorus containing flame retardant, including phosphorus containing flame retardant compounds which are substituted with groups that can react with the epoxy resin, for example, phosphorus containing flame retardants which can also act as a cross linking functions. Other materials, such as catalysts or accelerants, may also be present in the composition.

The term "cross-linker" is used interchangeably in the art, and herein, with the terms "hardener" or "curing agent" and as used herein also encompasses materials or compounds which form a cross linker, such as a phenolic cross linker, upon heating. Likewise, the term "catalyst" as used in relation to curable epoxy resins is used interchangeably with the term "accelerant".

The present invention is useful, for example, in the formation of electrical laminates such as those used in, e.g., printed circuit boards.

DESCRIPTION

One embodiment of the invention provides a curable epoxy resin composition comprising:
a) an epoxy resin,
b) a cross linker, and
c) from about 0.01 to about 4 parts per hundred parts of epoxy resin (phr) of an aluminum phosphonate, phosphinate or phosphate salt cure inhibitor of formula (I)

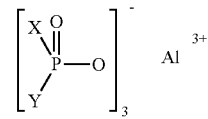

wherein X and Y are independently selected from $C_{1-10}$ alkoxy, $C_{1-10}$ alkyl, $C_{6-10}$ aryl, $C_{6-10}$ aryl substituted by one or more $C_{1-10}$ alkyl, $C_{6-10}$ aryloxy and $C_{6-10}$ aryloxy substituted by one or more $C_{1-10}$ alkyl.

For example, X and Y are independently selected from $C_{1-6}$ alkoxy and $C_{1-6}$ alkyl. In one embodiment X and Y are the same, in another embodiment X and Y are both alkyl, such as methyl, ethyl or propyl, for example, X and Y may both be ethyl.

Examples of phosphinic aluminum salts, e.g., compounds of formula I wherein X and Y are both alkyl, are found in the literature, for example, in U.S. Pat. No. 6,207,736 and U.S. Pat. No. 6,420,459, wherein the use of such compounds as flame retardants is disclosed. However, when used as a flame retardant, the amount of aluminum/phosphorus acid salts in the compositions are higher than the amounts when used as a cure inhibitor as in the present invention. For example, U.S. Pat. No. 6,420,459 discloses 5-60 parts of the phosphinic salt per 100 parts epoxy resin, whereas the instant invention employs less than 5 phr of the compounds of formula (i), for example, good results are obtained using 4 phr or less, for example, less than 3 phr parts per 100 parts epoxy resin have been found to be very effective.

In general, the amount of aluminum phosphorus acid salt in the present compositions will be from about 0.01 to about 4 parts per 100 parts epoxy resin, often from about 0.01 to about 3 parts phr, for example, from about 0.1 to about 2.5 phr or from about 0.1 to about 1.5 phr. Good results can be obtained at levels of 2 phr or less or 1 phr or less.

Another embodiment provides a composition comprising
a) an epoxy resin,
b) a cross linker, and
c) from about 0.01 to about 4 phr of an aluminum phosphonate, phosphinate or phosphate salt cure inhibitor of formula (i) above, and
d) a phosphorus containing flame retardant.

The phosphorus based flame retardant may comprise any of the known phosphorus flame retardants, such as those mentioned above, and are used in an amount effective to provide the desired flame retardancy. For example, amounts of from about 5 to about 60 phr are common.

The cross linker b) is, for example, a phenolic cross linker, such as novolac cross linker. In many embodiments of the invention, the phosphorus containing flame retardant d) will comprise phosphorus containing compounds that also contain functionality that can react with the epoxy resin, for example, hydroxy groups.

In embodiments where the phosphorus containing flame retardant does not contain epoxy reactable functionality, the cross linker b), which typically does not contain phosphorus, is present in the composition in amounts of from about 50 to about 150% of the stoichiometric amount needed to cure the epoxy resin, for example, in some embodiments the amount of crosslinker is from about 80 to about 125% of the stoichiometric amount of hydroxy groups needed to cure the epoxy resin.

For example, the cross linker b) may be a hydroxy functional cross linker, such as a novolac resins etc., and the composition comprises from about 50 to about 150% of the stoichiometric amount of hydroxy groups needed to cure the epoxy resin. In some embodiments, the amount of crosslinker is from about 80 to about 125% of the stoichiometric amount of hydroxy groups needed to cure the epoxy resin.

In embodiments where the phosphorus containing flame retardant d) does contain epoxy reactable functionality, the amount of cross linker b) is adjusted to reflect the presence of the additional reactive functionality so that the total epoxy reactive functionality comprised by components b) and d) together is from about 50 to about 150%, e.g., about 80 to about 125%, of the stoichiometric amount needed to cure the epoxy resin.

In a particular embodiment, the cross linker b) comprises a phenolic cross linker, such as a novolac cross linker, and the flame retardant d) comprises a hydroxy substituted phosphorus containing flame retardant, and components b) and d) when combined together comprise from about 50 to about 150%, e.g., about 80 to about 125%, of the stoichiometric amount of hydroxy groups needed to cure the epoxy resin.

In some embodiments of the invention, component a) comprises an epoxy resin containing phosphorus moieties which impart flame retardancy to the resin. The phosphorus containing flame retardant d) may or may not be present in compositions comprising such a resin.

In many embodiments of the invention, it is desirable that the phosphorus containing flame retardant comprise one or more phosphine oxides, i.e., compounds of the formula

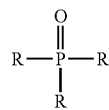

wherein R is an unsubstituted or substituted alkyl or aryl group.

In one embodiment, R is a phenyl ring which is unsubstituted or substituted by one or more hydroxy, amino, alkyl or alkoxy group, wherein the alkyl or alkoxy groups may be further substituted by hydroxy, amino or epoxy groups. In a particular embodiment, R is an alkyl group optionally substituted by hydroxy, or a phenyl ring optionally substituted by alkyl, hydroxy and/or hydroxyalkyl.

In many embodiments, the phosphorus containing flame retardant d) comprises one or more hydroxy substituted phosphorus containing compounds. As referred to above, a phosphorus containing flame retardant containing two or more hydroxy groups are known and are capable of acting as a crosslinker and flame retardant. In most embodiments where these cross linking flame retardants are used there is also a non-phosphorus containing crosslinker present as component b).

In one embodiment, the phosphorus containing flame retardant comprises at least one compound of the formulae

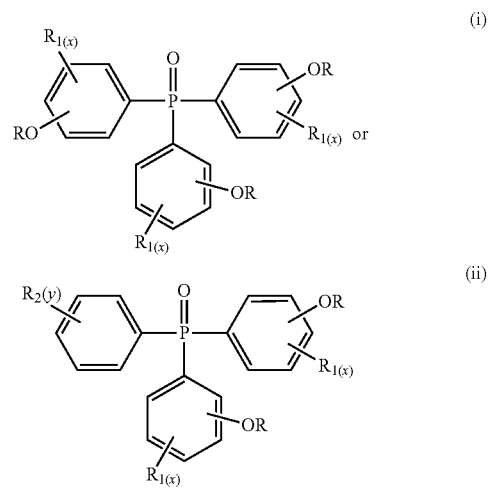

wherein each R is independently hydrogen or an alkyl group containing from 1 to 6 carbon atoms, $R_1$ and $R_2$ are the same or different and each is an alkyl group containing from 1 to 6 carbon atoms, each of x and y is an integer from 0 through 4. Often, the groups OR in formula (i), (ii) and (iii) are in the ortho or para position relative to the P-phenyl bond. It is understood that in the absence of a substituent OR, $R_1$ or $R_2$ at a particular carbon atom, that carbon atom is bound to a hydrogen atom.

Alkyl is for example straight or branched chain alkyl of the specified number of carbon atoms, for example, $C_{1-6}$ alkyl is selected from methyl, ethyl, propyl, isopropyl, butyl, sec-butyl, isobutyl, t-butyl, pentyl, iso-pentyl, t-pentyl, neo-pentyl, hexyl, methylpentyl isomers, ethyl butyl isomers, 1-propylpropyl. Alkoxy is for example an alkyl group as defined above bound to the phosphorous atom through a linking oxygen atom.

One particular embodiment provides a composition wherein cross linker b) is a phenolic cross linker and d) comprises at least one compound of formula (i) or (ii), wherein cross linker b) and flame retardant d) when combined, comprise hydroxy groups in an amount of from about 50% to about 150% of the stoichiometric amount of hydroxy groups needed to cure the epoxy resin.

In another embodiment, the phosphorus containing flame retardant d) comprises a mixture comprising:
at least one compound of the formula (i):

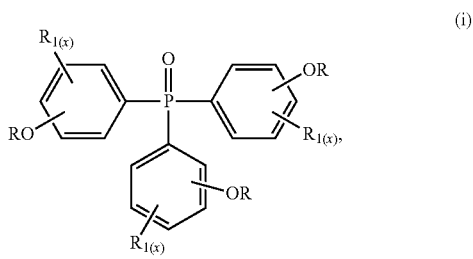

at least one compound of the formula (ii):

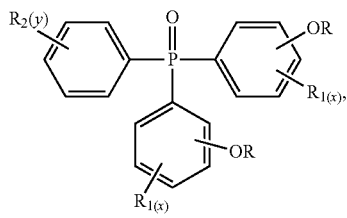

and at least one compound of the formula (iii):

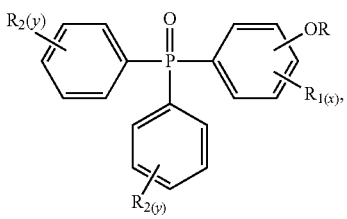

wherein OR, $R_1$, $R_2$, x and y are as defined above, and as above, the groups OR in formula (i), (ii) and (iii) are often in the ortho or para position relative to the P-phenyl bond, i.e., the ortho-position with respect to the bond between the P atom and the associated phenyl group.

In another particular embodiment, the phosphorus containing flame retardant comprises a mixture of at least one compound of each of formula (i), (ii) and (iii) wherein x and y are 0, R is hydrogen, and the ratio of the number of OR groups in the ortho-position with respect to the bond between the P atom and the associated phenyl group to the number of OR groups in the para-position with respect to the bond between the P atom and the associated phenyl group in the mixture is from about 20:80 to about 1:99, for example, from about 10:90 to about 2:98, for example from about 6:94 to about 3:97.

Often such a mixture of phosphine oxides will also comprises tri-phenylphosphine oxide.

For example, the phosphorus containing flame retardant comprises from about 10 to 50 wt % of one or more compounds of formula (i), from about 30 to 60 wt % of one or more compounds of formula (ii) from bout 10 to 50 wt % of one or more compounds of formula (iii) and from 0 to about 10 wt % tri-phenyl phosphine oxide based on the combined weight of compounds of formula (i), (ii), (iii) and tri-phenyl phosphine oxide.

The hydroxyphenyl phosphine oxides of the invention are known and their preparation is disclosed in the literature, e.g., hydroxy containing phosphine oxides are found in U.S. Pat. No. 6,733,698, U.S. Pat. No. 6,403,220, US Pub Pat Appl 2011/0065838, 20110065869 and 20110065870, and references therein, the relevant portions of which are incorporated herein by reference. In the above embodiments, it is also possible to use as the flame retardant component d) the reaction product of hydroxyphenyl phosphine oxides with epoxy containing reagents such as epihalohydrin.

Materials useful as cross linker b) in the present invention include phenolic cross linking agents having a functionality of at least 2 and include compounds, either polymeric or monomeric, having at least 2 phenolic —OH (hydroxyl groups) capable of reacting with epoxy groups at elevated temperatures such as:

a. Phenolic resins obtained from phenols or alkyl phenols and formaldehyde, such as phenol novolacs or resoles;
b. 3,4,5-trihydroxybenzoic acid (also known as gallic acid) or its derivatives, or pyrogallol (also known as 1,2,3-trihydroxybenzol), or 1,2,4-trihydroxybenzol (also known as hydroxyhydrochinon);
c. 1,8,9-trihydroxyanthracene or 1,2,10-trihydroxyanthracene;
d. 2,4,5-trihydroxypyrimidine;
e. tris(hydroxyphenyl)methane;
f. dicylcopentadiene phenol novolac;
g. tetraphenolethane; and
h. copolymers of styrene and hydroxystyrene.

For example, a novolac or a cresol novolac obtained by the condensation of phenols, cresols, xylenols or other alkyl phenols with a formaldehyde, many of which are well known and/or commercially available.

Examples of compounds which form a cross linking agent upon heating include benzoxazine and derivatives of benzoxazine. Examples include benzoxazine of phenolphthalein, benzoxazine of bisphenol-A, benzoxazine of bisphenol-F, benzoxazine of phenol novolac and the like.

Other cross linkers can be used either alone or as mixtures with cross linkers described above, for example, anhydrides such as a carboxylic acid anhydrides, styrene maleic anhydride copolymers, maleic anhydride adducts of methylcyclopentadiene and the like; amino compounds such as dicydiamide, sulfanilamide, 2,4-diamino-6-phenyl-1,3,5 triazine, and the like; carboxylic acids such as salicylic acid, phthalic acid and the like; cyanate esters such as dicyanate of dicyclopentadienyl bisphenol, dicyanate of bisphenol-A and the like; isocyanates such as MDI, TDI and the like; and bismaleic triazines and the like. Examples of suitable nitrogen-containing cross-linkers useful in the present invention, for example, polyamines, polyamides, sulfanilamide, diaminodiphenylsulfone, diaminodiphenyl methane, dicyandiamide, substituted dicyandiamide, 2,4-diamino-6-phenyl-1,3,5-triazine and the like may also be found in WO 99/00451.

Other cross linkers are described in U.S. patent application Ser. No. 09/008,983, and include for example copolymers of styrene and maleic anhydride having a molecular weight (Mw) in the range of from 1500 to 50,000 and an anhydride content of more than 15 percent. Commercial examples of these materials are available having, e.g., styrene-maleic anhydride ratios of 1:1, 2:1, and 3:1 respectively and having molecular weights ranging from 6,000 to 15,000.

Most often, cross linker b) will comprise a phenolic cross linker as the sole or primary cross linker, and any non-phenolic cross linkers will be used in lower quantities as co-cross linkers.

Generally, epoxy resin (a) of the present invention is non-halogenated epoxy resin material which possesses on average more than 1, typically at least 1.8, often at least 2 epoxy groups per molecule. In the broadest aspect of the present invention, the epoxy resin material may be any saturated or unsaturated aliphatic, cycloaliphatic, aromatic or heterocyclic compound which possesses more than one 1,2-epoxy group.

Representative epoxy resins suitable for use in the present invention can be found in standard texts, for example, Epoxy Resins Chemistry and Technology, Second Edition edited by Clayton A. May (Marcel Dekker, Inc. New York, 1988), Chemistry and Technology of Epoxy Resins edited by B. Ellis (Blackie Academic & Professional, Glasgow, 1993), Handbook of Epoxy Resins by H. E. Lee and K. Neville (McGraw Hill, New York, 1967). For example, suitable epoxy resins include epoxy resins based on bisphenols and polyphenols, such as, bisphenol A, tetramethylbisphenol A, bisphenol F, bisphenol S, tetrakisphenylolethane, resorcinol, 4,4'-biphenyl, dihydroxynaphthylene, and epoxy resins derived from novolacs, such as, phenol:formaldehyde novolac, cresol: formaldehyde novolac, bisphenol A novolac, biphenyl-, toluene-, xylene, or mesitylene-modified phenol:formaldehyde novolac, aminotriazine novolac resins and heterocyclic epoxy resins derived from p-amino phenol and cyanuric acid. Additionally, aliphatic epoxy resins derived from 1,4-butanediol, glycerol, and dicyclopentadiene skeletons, are suitable, for example. Many other suitable epoxy resin systems are available and would also be recognized as being suitable by one skilled in the art.

When the epoxy resin itself contains a phosphorus moiety, the phosphorus moiety is typically comprises reactive groups such as a phenolic group, an acid group, an amino group, an acid anhydride group, a phosphite group, or a phosphinate group which can react with the epoxy groups of a non-phosphorus element-containing epoxy resin compound. The phosphorus element-containing moiety may also contain epoxy groups.

For example, phosphorus containing epoxy resins may have incorporated therein materials such as the flame retardant compounds containing epoxy reactive functionality described above. Other phosphorus containing moieties can also be present in the epoxy resin, for example, U.S. Pat. No. 5,376,453 discloses epoxy resins into which are incorporated species such as methyl diglycidyl phosphonate, ethyl diglycidyl phosphonate, propyl diglycidyl phosphonate, butyl diglycidyl phosphonate, vinyl diglycidyl phosphponate, phenyl digycidyl phosphonate and biphenyl diglycidyl phosphonate; methyl diglycidyl phosphate, ethyl diglycidyl phosphate, n-propyl diglycidyl phosphate, n-butyl diglycidyl phosphate, iso-butyl diglycidyl phosphate, allyl diglycidyl phosphate, phenyl diglycidyl phosphate, p-methoxyphenyl diglycidyl phosphate, p-ethoxyphenyl diglycidyl phosphate, p-propyloxyphenyl diglycidyl phosphate, p-isopropyloxyphenyl digycidyl phosphate, phenylthiodiglycidyl phosphate, triglycidyl phosphate, tris(glycidylethyl)phosphate, p-glycidylphenyl ethyl glycidyl phosphate, benzyl diglycidyl thiophosphate. Such resins can be used in the present invention.

Useful phosphorus containing epoxy resins are also described in U.S. Pat. No. 6,403,220 and U.S. Pat. No. 6,645,631, including, for example, resins obtained by reacting an epoxy resin, such as an epoxy novolac, a dicyclopentadiene phenol epoxy novolac; a glycidyl of tetraphenolethane; a diglycidyl ether of bisphenol-A; or a diglycidyl ether of bisphenol-F and the like with a phosphorus element-containing compound such as a phosphite, a phosphinic acid, or compounds such as 9,10-dihydro-9-oxa-10-phosphaphenanthrene-10-oxide; 10-(2',5'-dihydroxyphenyl)-9,10-dihydro-9-oxa-10-phosphaphenanthrene-10-oxide; bis(4-hydroxyphenyl)phosphine oxide; tris(2-hydroxyphenyl)phosphine oxide; dimethyl-1-bis(4-hydroxyphenyl)-1-phenylmethylphonate; tris(2-hydroxy-4/5-methylphenyl)phosphine oxide; tris(4-hydroxyphenyl)phosphine oxide, bis(2-hydroxyphenyl)phenylphosphine oxide, bis(2-hydroxyphenyl)phenylophosphinate, tris(2-hydroxy-5-methylphenyl)phosphine oxide; and the like.

Phosphorus element-containing compounds useful in the preparation of phosphorus containing epoxy resins include for example, P—H functional compounds, for example 9,10-dihydro-9-oxa-10-phosphaphenanthrene-10-oxide (known as HCA or DOPO), dimethylphosphite, diphenylphosphite, ethylphosphonic acid, diethylphosphinic acid, methyl ethylphosphinic acid, phenyl phosphonic acid, phenyl phosphinic acid, vinyl phosphoric acid, phenolic 10-(2',5'-dihydroxyphenyl)-9,10-dihydro-9-oxa-10-phosphaphenanthrene-10-oxide (known as HCA-HQ, or DOPO-HQ) and the like and amino functional compounds such for example bis(4-aminophenyl)phenylphosphate.

Commercially available resins useful in the present invention include phosphorus containing epoxy resins based on 9,10-dihydro-9-oxa-10-phosphaphenanthrene-10-oxide based epoxy resins.

Other examples of epoxy resins useful in the present invention include those described in WO 99/00451 and U.S. Pat. No. 5,112,931, such as an epoxy resin which is the reaction product of an epoxy compound containing at least two epoxy groups and a chain extender, for example, an epoxy-polyisocyanate adduct or an epoxy-terminated polyoxazolidone as described in. The isocyanate compounds as chain extenders include for example MDI, TDI and isomers thereof.

Often, the epoxy resin will be a non-halogenated, non-phosphorus element-containing epoxy resin which either has no alkyl aliphatic substituents or has a low amount of alkyl aliphatic substituents, such as, for example the glycidyl ether of a phenol novolac, or the glycidyl ether of bisphenol-F, the glycidyl ether of bisphenol-S, bisphenol-A, or dihydroxyl ether of fluorene 9-bisphenyl; or trisepoxy, or dicyclopentadiene modified phenol epoxy resin, or mixtures thereof.

For example, the epoxy resin is an epoxy novolac resin (sometimes referred to as epoxidized novolac resins, a term which is intended to embrace both epoxy phenol novolac resins and epoxy cresol novolac resins), which are commercially available.

Generally, the epoxy resin (a) is used in an amount of from about 30 wt % to about 95 wt %. More than one epoxy resin may be present in the composition.

Of course, in addition to elements (a), (b), (c) and (d), the compositions herein may be formulated with additional additives and fillers to affect cure rate, enhance flame retardancy, and increase the physical properties of the cured epoxy resin composition. For example, catalysts such as amine containing catalysts are generally employed in the composition, for example 2-methylimidazole or a mixture of m-phenylenediamine dicyandiamide and methylimidazole.

Combinations of nitrogen-containing catalyst with Lewis acids such as combinations of heterocyclic secondary and tertiary amines with Lewis acids such as oxides and hydroxides of zinc, tin, silicon, aluminum, boron, and iron can also be used.

Typically, fillers and reinforcing agents include mica, talc, kaolin, bentonite, wollastonite, glass fiber, glass fabrics glass matt, milled glass fiber, glass beads (solid or hollow), silica, or silicon carbide whiskers and so forth. Many of these materials are described in standard industry texts such as the Encyclopedia of Materials Science and Engineering, Vol. #3, pp. 1745-1759, MIT Press, Cambridge, Mass. (1986). In prepregs and laminates for printed wiring boards, reinforcing agents such as glass fabric, may be the substrate to which the composition is applied.

Additionally, the curable epoxy resin described herein may be formulated with other flame-retardant materials as co-additives to improve their performance. These co-FR materials could be either inorganic or organic and can be reactive or additive based compounds. Examples of inorganic additive type materials include, but are not limited to, aluminum trihydrate (ATH), magnesium hydroxide, barium hydroxide, calcium carbonate, titanium dioxide, arid silicon dioxide. Examples of organic based additives or reactives include, but are not limited to, triphenyl phosphate, resorcinol bis(di-2,6-xylyl phosphate), melamine, melamine phosphate, melamine borate and many others familiar to one skilled in the art.

In addition, other additives commonly found in epoxy reins, including stabilizers, processing aids, colorants, etc may also be present.

The above compositions are prepared by combining the components according to techniques well-known to any one familiar with the art. Inert solvents may be used in preparing the compositions and may be present in the composition when it is cast, applied to a substrate, or introduced into a mold. Curing is accomplished in the common manner by heating the composition. In many practical embodiments, a curing catalyst is present in the composition during cure.

For example, the epoxy resin a), crosslinker b) and phosphorus containing flame retardant d) are combined along with other optional components such as a catalyst, filler etc, and at any time prior to the application or impregnation onto or into a substrate the cure inhibitor c) is incorporated into the epoxy composition. The coated substrate is then heated in one or more heating steps to create a cured epoxy resin.

One embodiment of the invention relates to the process of slowing the cure rate of a curable epoxy composition by adding a small amount of the aluminum/phosphate, phosphonate or phosphinate salt and another embodiment relates to a composition comprising
a) an epoxy resin,
b) a cross linker, and
c) a means for slowing or inhibiting resin cure, said means comprising from 0.1 to 3 parts per hundred parts of epoxy resin of an aluminum phosphonate, phosphinate or phosphonate salt cure inhibitor selected from compounds having the structure I:

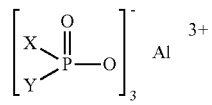

wherein X and Y are independently selected from wherein X and Y are independently selected from $C_{1-10}$ alkoxy, $C_{1-10}$ alkyl, $C_{6-10}$ aryl, $C_{6-10}$ aryl substituted by one or more $C_{1-10}$ alkyl, $C_{6-10}$ aryloxy and $C_{6-10}$ aryloxy substituted by one or more $C_{1-10}$ alkyl.

One example of the value of slowing the cure rate of certain epoxy resin compositions is related to providing adequate gel time of epoxy resins in the formation of electric laminates, for example, laminates and prepregs such as those used in the production of circuit boards. In such applications the composition is applied to, or impregnated onto, a substrate, such as a woven or nonwoven fiber mat containing, for instance, glass fibers or paper. The coated substrate is then B-staged by heating at a temperature sufficient to draw off solvent from the epoxy formulation and optionally to partially cure the epoxy formulation to form a prepreg, followed by stacking sheets of prepreg or layering sheets of prepreg, in alternating layers, with one or more sheets of a conductive material followed by processing to provide fully processed laminates.

One difficulty encountered in the art in preparing the above laminates is that some curable epoxy compositions have gel times as observed by the stroke cure test, of less, sometimes much less, than 180 seconds, which complicates the production of prepregs in forming the laminates. Gel times greater than 180 seconds, for example 250 seconds, for example 300 seconds or greater are more desirable and are readily obtained using the present invention.

As described in the Experimental section, it is shown that the presence of the instant cure inhibitors provide a systematic effect on the cure rate of many epoxy compositions, for example epoxy novolac compositions. For example, adding a tri-(bis-$C_{1-6}$ alkylphosphinic acid)/aluminum salt as a cure inhibitor is shown to have a profound effect on the gel times of curable epoxy resin formulations, such as formulations comprising an epoxy novolac resin, a novolac hardener. In a particular example, a composition comprising the preceding epoxy resin, hardener, cure inhibitor and a flame retardant comprising a mixture of at least one compound of each of formulae (i), (ii) and (iii) above plus triphenyl phosphine oxide did not gel even after 10 minutes of heat application, whereas the same epoxy system without the aluminum phosphorus cure inhibitor had a gel time of approximately 180 seconds at 170° C.

In the appended experiments, formulations containing a commercial novolac epoxy resin and a commercial phenolic novolac were prepared to which were added small, incrementally larger amounts of aluminum tris-(diethylphospinate), i.e. from about 0.1 phr to about 2.5 phr. With each addition, a corresponding increase in gel time was observed which increased as the dose of inhibitor increased. Formulations which contained, in addition to the epoxy resin and curing agent, 2-methylimidazole as accelerant; a flame retardant mixture containing at least one compound of formulae (i), (ii) and (iii) and triphenyl phosphine oxide, referred to below as FRCL; and/or aluminum trihydroxide, showed similar effects. As the flame retardant mixture FRCL also functioned as a cross linker, appropriate adjustments in the novolac cross linker concentration were made to keep the hydroxyl/epoxy stoichiometric ratio the same for both systems and the amount of catalyst was adjusted to account for the different inherent activity of the different cross linking reagents.

As it is common for a cure catalyst to be present in such compositions, the present invention allows the practitioner to effectively control the gel time by adjusting the types and/or amounts of the present cure inhibitor and any optional catalyst added.

Embodiments of the invention thus include forming, applying and curing the present compositions; the process of preparing prepregs and laminates from the composition; and the prepregs and laminates so produced.

EXPERIMENTAL

Aluminum diethylphosphinate, $Al(Et_2PO_2)_3$, is a known compound which can be obtained commercially and can also be prepared according to procedures found in U.S. Pat. No. 6,207,736 and U.S. Pat. No. 6,420,459, the relevant portions of which are incorporated herein by reference.

Aluminum ethyl ethylphosphonate was prepared according to a known procedure: Diethyl ethylphosphonate (414 g), sodium hydroxide (199.5), and water (2.4 L) were refluxed for 4 h. A solution of aluminum sulfate hydrate (261 g) in water (830 mL) was then slowly added to form a white slurry. After filtration and drying, 319.7 g of aluminum ethyl ethylphosphonate was obtained as a white solid.

Aluminum ethylphosphate was prepared according to a known procedure: Triethylphosphate (40 g), sodium hydroxide (17.5 g), and water (0.4 L) were refluxed for 2.5 h. A solution of aluminum sulfate hydrate (23.8 g) in water (300 mL) was then slowly added to form a white slurry. After filtration and drying, 36.7 g of aluminum ethylphosphate was obtained as a white solid.

FRCL is a composition containing phosphine oxide flame retardants, some of which are also cross linkers, and comprises:
from about 10 to about 50 wt % based on the weight of the phosphine oxide mixture at least one compound of the formula (i)

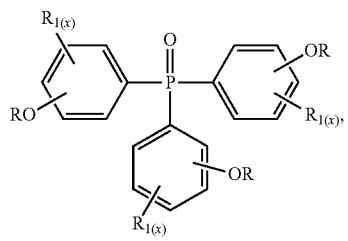

from about 30 to about 60 wt % based on the weight of the phosphine oxide mixture at least one compound of the formula (ii):

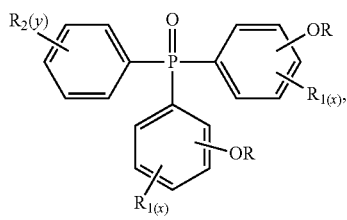

from about 10 to about 50 wt % based on the weight of the phosphine oxide mixture and at least one compound of the formula (iii):

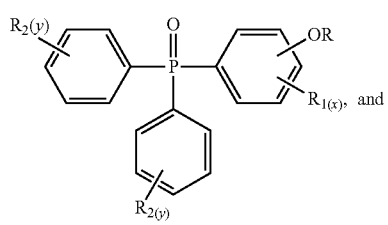

from 0 to about 10 wt % based on the weight of the phosphine oxide mixture of triphenyl phosphine oxide, wherein each OR is independently in the ortho or para position with respect to the bond between the P atom and the associated phenyl group, R is hydrogen, x and y are 0, and the ratio of the number of OR groups in the ortho-position to the number of OR groups in the para-position in the mixture is from about 20:80 to about 1:99.

Cure Rates

Cure rates of various formulations were compared by determining the gel point at 170° C. according to standard stroke cure tests, i.e., IPC Test Method IPC-TM-650-2.3.18.

In the following formulations, DEN 438 is a novolac epoxy resin from Dow Chemical; SD 1708 is a phenolic novolac curing agent from Hexion/Momentive; 2-MI is 2-methylimidazole; and FRCL is the phosphorus oxide composition described above. As some of the components of FRCL are also cross linkers, the following formulations are adjusted to maintain a hydroxyl/epoxy ratio of 0.95 for each formulation. As elsewhere in the specification, phr refers to parts per hundred parts by weight of epoxy resin, e.g., per 100 parts DEN 438.

Formulations were prepared according to standard general procedures wherein the cross linkers SD 1708 and/or FRCL are mixed with acetone, the mixture was heated to dissolve the cross linker(s) then cooled, and the epoxy resin DEN 438 and ATH if present are added in acetone. Due to typically encountered, minor variations in epoxy formulations, the required amounts of 2-MI catalyst, i.e., accelerator and/or cure inhibitor are determined empirically by adding test amounts to the above formulation and measuring the reactivity.

Epoxy Resin Formulation 1

A mixture of 23.0 phr of novolac resin SD 1708 and 53.5 phr of the mixture FRCL were heated in acetone according to the general procedure and upon cooling 100 parts of epoxy resin DEN 438 in acetone was added.

Epoxy Resin Formulation 2

Following the general procedure, a formulation containing 55.5 phr of novolac resin SD 1708 and 100 parts of epoxy resin DEN 438 in acetone was prepared.

Accelerant (2-methylimidazole, 2-MI) and aluminum ethylphosphinate, i.e., $Al(Et_2PO_2)_3$ were added to the formulations as indicated in Table 2 to determine the effect on the gel time. Formulation 1 was cured both with and without 2-MI catalyst present. The data shows that as the level of aluminum ethylphosphinate was increased, the cure time also increased proportionally.

TABLE 1

Effect of aluminum ethylphosphinate on Gel Time in seconds at 170° C.

| Formulation 1. no 2MI $Al(Et_2PO_2)_3$, | | Formulation 1. plus 0.31 phr 2MI $Al(Et_2PO_2)_3$ | | Formulation 2. plus 0.05 phr 2MI $Al(Et_2PO_2)_3$ | |
|---|---|---|---|---|---|
| phr | gel time | OP 930, phr | gel time | phr | gel time, |
| 0 | 224 sec. | 0 | 192 sec. | 0 | 301 sec. |
| 0.165 | 220 | 0.108 | 198 | 0.491 | 564 |
| 0.293 | 244 | 0.208 | 212 | | |
| 0.397 | 260 | 0.331 | 224 | | |
| 0.515 | 284 | 0.496 | 257 | | |
| 0.634 | 323 | 0.655 | 270 | | |
| 0.761 | 352 | 0.865 | 313 | | |
| 0.946 | 439 | 1.147 | 362 | | |
| 1.144 | 502 | 1.495 | 422 | | |
| 1.348 | 598 | 1.897 | 526 | | |
| 1.513 | 669 | 2.425 | 618 | | |

In another series of experiments, 1.5 phr $Al(Et_2PO_2)_3$ was added to Epoxy Resin Formulation 1, various levels of 2-MI were then added and the cure time was measured as shown in Table 2. As 2-MI was added to the formulation the resulting gel times decreased, eventually returning to the original resin gel time.

TABLE 2

Effect of 2-MI on Gel Time at 170° C.

| 2-MI, phr | Gel Time, s |
|---|---|
| 0 | 669 |
| 0.018 | 581 |
| 0.039 | 541 |
| 0.077 | 467 |
| 0.123 | 382 |
| 0.180 | 290 |
| 0.242 | 232 |
| 0.307 | 192 |

These results demonstrate some of the flexibility and control over cure time that can be achieved by adjusting the levels of an amine based accelerator and the present cure inhibitors.

Effect of Phosphorus Containing Acid Component of the Salt

Aluminum salts containing a phosphorus anion wherein the oxidation state of phosphorus was different were compared for effectiveness as cure inhibitors. The anions chosen were a phosphinate, phosphonate, and phosphate. Formulation 1 (no 2-MI) was used. The formulation was prepared and split into various batches for this study. The results of the gel point tests for each of the salts are listed in Table 3. In each case the gel time increased from the base resin value of 190 seconds for the gel point at 170° C. The salts were added incrementally to the resin base formulation until a gel point of around 300 seconds was obtained. This was done so the effectiveness of each salt could be compared, one to another. The salt that had the greatest effect was the phosphinate salt. 2-MI was then added to the resin formulations until the reactivity was similar to the starting base resin. The stroke cured material was then post-cured at 190° C. for 90 minutes. The data show that aluminum salts of phosphorus acids do inhibit the curing of epoxy resins in a general way and are not specific to OP 930.

TABLE 3

Effect of Phosphorus Oxidation State on Gel Time in the Stroke Cure Test.

| | Inhibitor (phr) | Gel Time (sec) | 2-MI (phr) | Gel Time (sec) |
|---|---|---|---|---|
| Formulation 1 | 0 | 190 | | |
| Aluminum tri-(diethyl phosphinate) | 0.63 | 306 | 0.11 | 206 |
| Aluminum ethyl ethylphosphonate | 1.27 | 323 | 0.12 | 220 |
| Aluminum ethylphosphate | 1.84 | 293 | 0.17 | 197 |

What is claimed:

1. A composition comprising
a) an epoxy resin,
b) a cross linker comprising a phenolic cross linker and wherein the composition comprises from about 50 to about 150% of the stoichiometric amount of hydroxy groups needed to cure the epoxy resin,
c) from 0.1 to 2 parts per hundred parts of epoxy resin of an aluminum phosphonate, phosphinate or phosphate salt cure inhibitor selected from compounds having the formula I:

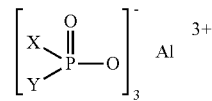

wherein X and Y are independently selected from $C_{1-10}$ alkoxy, $C_{1-10}$ alkyl, $C_{6-10}$ aryl, $C_{6-10}$ aryl substituted by one or more $C_{1-10}$ alkyl, $C_{6-10}$ aryloxy and $C_{6-10}$ aryloxy substituted by one or more $C_{1-10}$ alkyl, and d) a phosphorus containing flame retardant comprising from about 10 to 50 wt % of one or more compounds of formula (i)

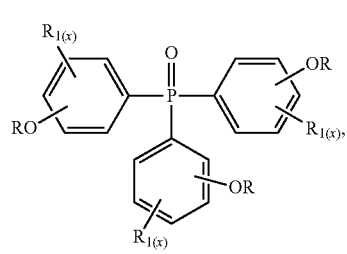

from about 30 to 60 wt % of one or more compounds of formula (ii)

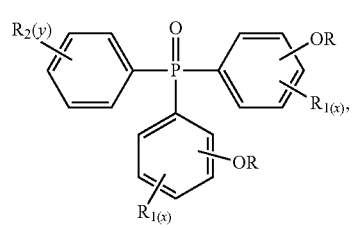

from about 10 to 50 wt % of one or more compounds of formula (iii)

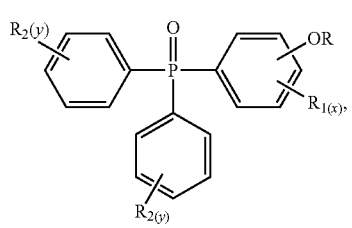

and
from 0 to about 10 wt % tri-phenyl phosphine oxide based on the combined weight of compounds of formula (i), (ii), (iii) and tri-phenyl phosphine oxide,
wherein each R is independently hydrogen or an alkyl group containing from 1 to 6 carbon atoms, $R_1$ and $R_2$ are the same or different and each is an alkyl group containing from 1 to 6 carbon atoms, each of x and y is an integer from 0 through 4.

2. The composition according to claim 1 wherein each OR in the compounds of formulae (i), (ii) and (iii) are independently in the ortho- or para- position with respect to the bond between the P atom and the associated phenyl group.

3. The composition according to claim 2 wherein x and y are 0, R is hydrogen, and the ratio of the number of OR groups in the ortho-position with respect to the bond between the P atom and the associated phenyl group to the number of OR groups in the para-position with respect to the bond between the P atom and the associated phenyl group in the mixture is from about 20:80 to about 1:99.

4. The composition according to claim 3 wherein the ratio of the number of OR groups in the ortho-position with respect to the bond between the P atom and the associated phenyl group to the number of OR groups in the para-position with respect to the bond between the P atom and the associated phenyl group in the mixture is from about 10:90 to about 2:98.

5. The composition of claim 1 wherein the cure inhibitor c) is a aluminum phosphinate salt of formula I wherein X and Y are independently selected from $C_{1-10}$ alkyl, $C_{6-10}$ aryl and $C_{6-10}$ aryl substituted by one or more $C_{1-10}$ alkyl.

6. The composition of claim 1 wherein the epoxy resin a) comprises an epoxy novolac resin.

7. The composition of claim 1 wherein the cross linker b) comprises a novolac cross linker.

8. A process of slowing the cure rate of a curable epoxy composition by adding to an epoxy composition comprising an epoxy resin, a cross linker and a phosphorus containing flame retardant comprising from about 10 to 50 wt % of one or more compounds of formula (i)

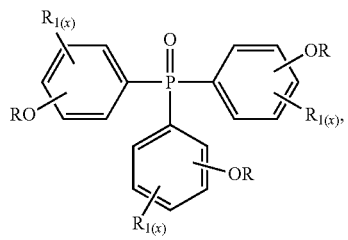

(i)

from about 30 to 60 wt % of one or more compounds of formula (ii)

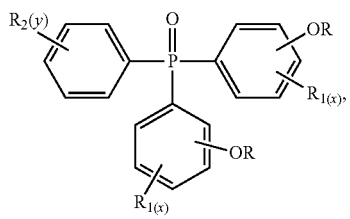

(ii)

from about 10 to 50 wt % of one or more compounds of formula (iii)

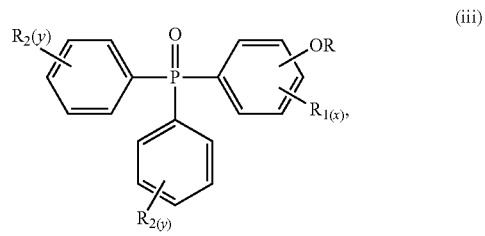

(iii)

and from 0 to about 10 wt % tri-phenyl phosphine oxide based on the combined weight of compounds of formula (i), (ii), (iii) and tri-phenyl phosphine oxide, wherein each R is independently hydrogen or an alkyl group containing from 1 to 6 carbon atoms $R_1$ and $R_2$ are the same or different and each is an alkyl group containing from 1 to 6 carbon atoms, each of x and y is an integer from 0 through 4, from 0.1 to 2 parts per hundred parts of epoxy resin of an aluminum phosphonate, phosphinate or phosphate salt cure inhibitor selected from compounds having the structure I:

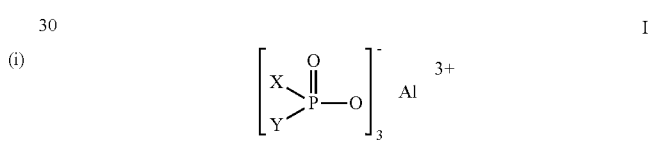

I wherein X and Y are independently selected from $C_{1-10}$ alkoxy, $C_{1-10}$ alkyl, $C_{6-10}$ aryl, $C_{6-10}$ aryl substituted by one or more $C_{1-10}$ alkyl, $C_{6-10}$ aryloxy and $C_{6-10}$ aryloxy substituted by one or more $C_{1-10}$ alkyl.

9. A prepreg pepared by applying to, or impregnating into a substrate the composition according to claim 1 to obtain an epoxy coated substrate, heating the epoxy coated substrate at a temperature sufficient to draw off solvent from the epoxy formulation and optionally to partially cure the epoxy formulation to form the prepreg.

10. A laminate prepared by by stacking or layering sheets of prepreg according to claim 9 in alternating layers with one or more sheets of a conductive material, followed by processing to provide fully processed laminates.

11. The composition according to claim 1 further comprising e) an amine containing accelerant.

12. The process according to claim 9 wherein the curable epoxy composition further comprises an amine containing accelerant.

* * * * *